Sept. 13, 1932.  M. T. COELHO  1,877,388
SPRINKLER AND LAWN SWEEPER
Filed Nov. 27, 1931
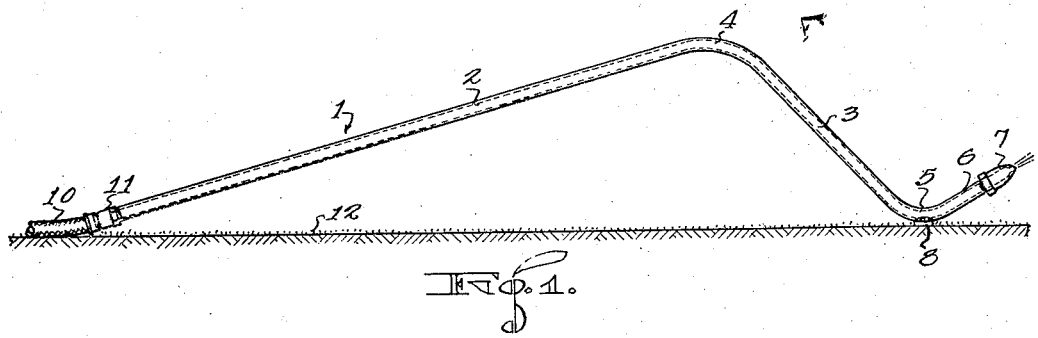
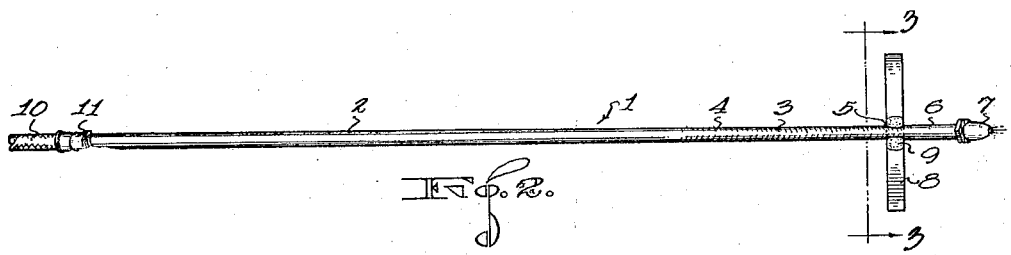
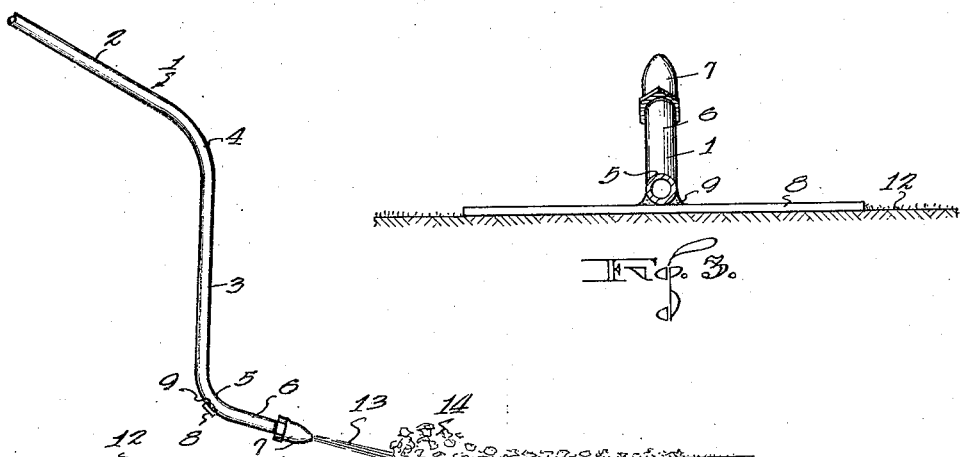
INVENTOR.
MANUEL T. COELHO.
BY Munn & Co
ATTORNEYS.

Patented Sept. 13, 1932

1,877,388

UNITED STATES PATENT OFFICE

MANUEL T. COELHO, OF REDWOOD CITY, CALIFORNIA

SPRINKLER AND LAWN SWEEPER

Application filed November 27, 1931. Serial No. 577,606.

My invention relates to improvements in a sprinkler and lawn sweeper and it consists of the combinations, constructions and arrangements hereinafter described and claimed.

An object of my invention is to provide a sprinkler and lawn sweeper which is extremely simple in construction, consisting of a single pipe section rigid in construction and bent in a novel manner for providing a handle portion and for inclining the nozzle at an angle for directing the water over the lawn. The pipe section is supported in an upright position by means of a base portion.

A water hose is attached to the opposite end of the pipe section and is swivelly connected so that there can be a relative turning movement between the hose and the pipe section.

The device is extremely light in construction and may be grasped by the operator, and the pipe section is so inclined that when it is held by the operator, the nozzle will be disposed a slight distance above the ground and the water will be directed along the surface of the ground for removing leaves and the like from the lawn. The device, when used in this respect, acts as a lawn sweeper.

Other objects and advantages will appear in the following specification, and the novel features of the device will be particularly pointed out in the appended claims.

My invention is illustrated in the accompanying drawing forming a part of this application, in which Figure 1 is a side elevation of the device;
Figure 2 is a top plan view;
Figure 3 is a section along the line 3—3 in Figure 2; and
Figure 4 is a view showing the device used as a lawn sweeper.

In carrying out my invention, I provide a pipe section 1 which has a relatively long straight portion 2. A second portion 3 is preferably shorter in length than the portion 2 and extends at an angle with respect to the portion 2. A curved portion 4 connects the portions 2 and 3.

The pipe section 1 is again bent at 5, and a nozzle-supporting portion 6 extends at an angle to the portion 3. A water nozzle, indicated generally at 7, is removably secured to the end portion 6.

The device is held in the position shown in Figure 1 by a base 8, (see Figure 2). This base is soldered, or otherwise secured to the pipe section 1 at 9. The base 8 is preferably disposed at the bend 5.

The opposite end of the pipe section 1 is connected to a water hose 10 by a swivel joint or coupling 11. Figure 3 clearly shows how the base 8 extends at right angles to the length of the pipe section 1 and further shows how the base is secured to the pipe section.

From the foregoing description of the various parts of the device, the operation thereof may be readily understood.

The device, when laid on the lawn 12, as shown in Figure 1, causes the end portion 6 to extend at an angle and this will cause the nozzle 7 to project the water from the nozzle at an angle to the lawn surface. The portions 2 and 3 are of such a length as to dispose the curved portion 4 a sufficient distance above the ground to be readily grasped by the operator when it is desired to move the sprinkler from place to place. It is unnecessary for the operator to stoop over very far when grasping the handle portion 4.

Figure 4 shows the device used as a lawn sweeper. The portion 2 is held in the hands of the operator, and the operator can incline this portion with respect to the lawn surface so as to cause the stream of water 13 issuing from the nozzle 7 to project in a substantially horizontal direction. The nozzle 7 can be adjusted so as to cause the water stream to issue with a considerable force, and the operator can move the device for causing the stream to sweep the lawn clear from leaves 14 or other débris. The device is extremely light in construction, and, therefore, it can be readily moved from place to place in sweeping the lawn or when used as a sprinkler.

While I have shown only the preferred form of my invention, it should be understood that various changes or modifications may be made within the scope of the appended claims without departing from the spirit of the invention.

I claim:

1. A lawn sprinkler comprising a rigid pipe having three portions inclined with respect to each other, one end and central portion constituting a handle, the end being connectible to a water hose, a nozzle secured to the other end portion, and means for supporting the sprinkler for inclining the nozzle-carrying portion at an angle with respect to the ground, said means comprising a base extending transverse to the length of the pipe and being secured to the pipe at the juncture between the central portion and the nozzle-carrying portion.

2. A lawn sprinkler comprising a pipe bent intermediate of its ends so as to present two substantially parallel end sections arranged in spaced relation, an offset portion connecting the sections, a spray nozzle attached to one end of the pipe, a conduit-receiving member mounted on the other end and a surface-engaging base fixed to and projecting laterally of the pipe for supporting the latter.

MANUEL T. COELHO.